US009607739B2

(12) United States Patent
Ozaki

(10) Patent No.: US 9,607,739 B2
(45) Date of Patent: Mar. 28, 2017

(54) METHOD FOR BONDING FLAT CABLE AND BONDING OBJECT, ULTRASONIC BONDING DEVICE, AND CABLE

(71) Applicant: Yazaki Corporation, Tokyo (JP)

(72) Inventor: Masahito Ozaki, Susono (JP)

(73) Assignee: Yazaki Corporation, Tokyo (JP)

( * ) Notice: Subject to any disclaimer, the term of this patent is extended or adjusted under 35 U.S.C. 154(b) by 35 days.

(21) Appl. No.: 14/803,408

(22) Filed: Jul. 20, 2015

(65) Prior Publication Data
US 2016/0035463 A1  Feb. 4, 2016

(30) Foreign Application Priority Data

Jul. 30, 2014  (JP) ................ 2014-155080
Jul. 30, 2014  (JP) ................ 2014-155081

(51) Int. Cl.
B23K 1/06      (2006.01)
H01B 13/06     (2006.01)
H01B 7/08      (2006.01)
H01B 13/00     (2006.01)
B23K 20/10     (2006.01)
H01R 43/02     (2006.01)
(Continued)

(52) U.S. Cl.
CPC ............ H01B 13/06 (2013.01); B23K 20/10 (2013.01); B23K 20/106 (2013.01); B23K 20/233 (2013.01); H01B 7/08 (2013.01); H01B 13/0016 (2013.01); H01B 13/0036 (2013.01); H01R 43/0207 (2013.01); B23K 2201/34 (2013.01); B23K 2201/38 (2013.01); B23K 2203/18 (2013.01); H01R 4/023 (2013.01)

(58) Field of Classification Search
CPC ...... H01B 13/06; H01B 7/08; H01B 13/0016; H01B 13/0036; B23K 20/106; B23K 20/233; B23K 20/10; B23K 2203/18; B23K 2201/38; B23K 2201/34; B23K 20/103; B23K 20/105; H01R 43/0207; H01R 4/023
USPC .................. 228/1.1, 110.1, 180.5, 4.5, 904
See application file for complete search history.

(56) References Cited

U.S. PATENT DOCUMENTS 3,708,878 A *  1/1973  Mann, Sr. ......... H01R 43/0207
                                                    29/860
3,822,465 A *  7/1974  Frankort ............... B23K 20/10
                                                    156/73.2

(Continued)

FOREIGN PATENT DOCUMENTS

EP       0614247 A2 *  9/1994  ......... H01R 4/2495
JP       2009-043538 A    2/2009

Primary Examiner — Kiley Stoner
(74) Attorney, Agent, or Firm — Locke Lord LLP

(57) ABSTRACT

Provided is a method capable of reducing the amount of a coating part remaining between a conductor and a bonding object. A chip comes closer to an anvil so that the flat cable and the terminal are sandwiched between the chip and the anvil. The flat cable and the terminal are pressed so as to come close to each other. When the chip ultrasonically vibrates, vibrations of the chip propagate to the terminal, causing the terminal to ultrasonically vibrate. Then heat is generated in a plate part by friction between the chip and the plate part. The coating part being positioned between the conductor and the plate part melts from the generated heat and is removed. Thereby the conductor and the plate part come into contact with each other resulting in a solid-phase bonding together.

12 Claims, 18 Drawing Sheets

(51) Int. Cl.
*B23K 20/233* (2006.01)
*H01R 4/02* (2006.01)
*B23K 101/34* (2006.01)
*B23K 101/38* (2006.01)
*B23K 103/18* (2006.01)

(56) References Cited

U.S. PATENT DOCUMENTS

| | | | | |
|---|---|---|---|---|
| 5,785,786 A * | 7/1998 | Suzuki | ............ | B62D 27/02 156/204 |
| 5,929,384 A * | 7/1999 | Ide | ............ | H01R 4/70 174/84 R |
| 5,954,549 A * | 9/1999 | Shinchi | ............ | H01R 43/0207 156/73.1 |
| 5,957,735 A * | 9/1999 | Shinchi | ............ | H01R 13/504 439/731 |
| 5,971,251 A * | 10/1999 | Moore | ............ | H01R 4/023 228/112.1 |
| 6,017,238 A * | 1/2000 | Johnston | ............ | H01R 13/504 439/404 |
| 6,021,565 A * | 2/2000 | Shinchi | ............ | H01R 43/0207 29/749 |
| 6,027,009 A * | 2/2000 | Shinchi | ............ | H01R 4/024 228/111.5 |
| 6,142,838 A * | 11/2000 | Shinchi | ............ | H01R 4/029 228/110.1 |
| 6,239,375 B1 * | 5/2001 | Shinchi | ............ | H01R 4/023 174/88 R |
| 2001/0035296 A1 * | 11/2001 | Ishii | ............ | H01R 43/0207 174/88 R |
| 2002/0017550 A1 * | 2/2002 | Murakami | ............ | B23K 20/10 228/110.1 |
| 2002/0130159 A1 * | 9/2002 | Kondo | ............ | B23K 20/10 228/110.1 |
| 2004/0020580 A1 * | 2/2004 | Oishi | ............ | B23K 20/106 156/73.1 |
| 2004/0232208 A1 * | 11/2004 | Kondo | ............ | B23K 20/10 228/110.1 |
| 2006/0208033 A1 * | 9/2006 | Welter | ............ | B23K 11/002 228/110.1 |
| 2007/0068991 A1 * | 3/2007 | Handel | ............ | B23K 20/106 228/1.1 |
| 2010/0140325 A1 | 6/2010 | Tokutomi et al. | | |

* cited by examiner

FIG. 5
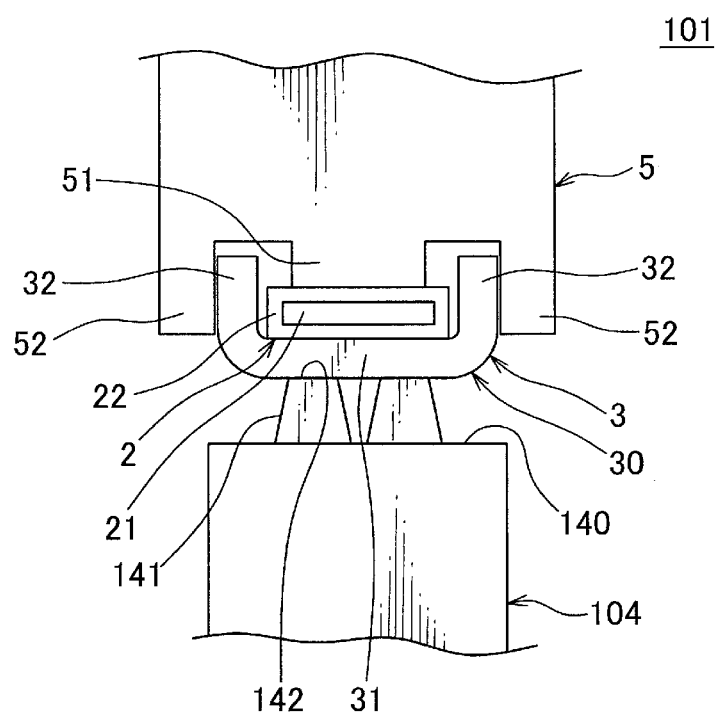
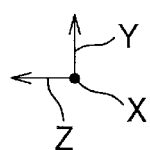

FIG. 7
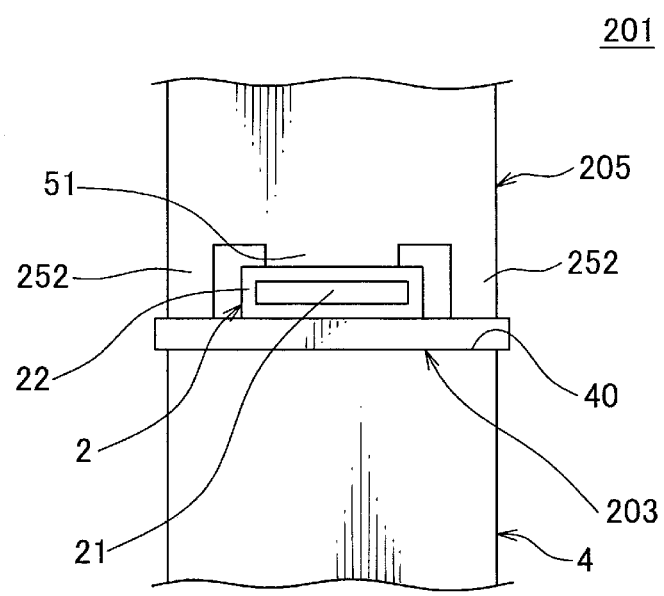
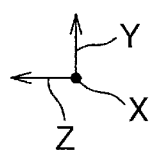

METHOD FOR BONDING FLAT CABLE AND BONDING OBJECT, ULTRASONIC BONDING DEVICE, AND CABLE

BACKGROUND

Technical Field

The present invention relates to a bonding method for bonding a flat cable and a bonding object together by using an ultrasonic bonding device, an ultrasonic bonding device used in the bonding method, and a cable obtained by using the bonding method.

Related Art

JP 2009-43538 A discloses an ultrasonic bonding device used for bonding a conductor of a flat cable and a bonding object such as a terminal together. FIG. 18 is a perspective view of a chip 614 attached to a horn of the ultrasonic bonding device 601. As shown in FIG. 18, the chip 614 has a flat end face 617 facing an anvil, and a plurality of grooves 618 forming depressions on the end face 617. The grooves 618 extend in a linear shape orthogonally to the vibration direction W of the chip 614.

The following is a description of a method for bonding a flat cable and a bonding object together by using the above-mentioned ultrasonic bonding device 601. First, the bonding object is positioned on the anvil, and the flat cable is placed on the bonding object. Then, the chip 614 is moved toward the anvil in such a manner that the chip 614 and the anvil press the flat cable and the bonding object in directions so as to move the flat cable and the bonding object close to each other. Concurrently with that, the chip 614 is ultrasonically vibrated in the direction W to vibrate the flat cable, whereby a coating part of the flat cable melts and then enters the grooves 618. Consequently, the conductor of the flat cable and the bonding object come into contact with each other, resulting in a solid-phase bonding together.

In the bonding method for bonding a flat cable and a bonding object using the above-mentioned ultrasonic bonding device 601, a portion of the coating part sometimes remains between the conductor of the flat cable and the bonding object.

An objective of the present invention is, therefore, to provide a bonding method for bonding a flat cable and a bonding object by using an ultrasonic bonding device, and in particular, a bonding method for bonding the flat cable and a terminal, which enables reduction of the amount of the coating part remaining between the conductor of the flat cable and the bonding object. Also provided in the invention are an ultrasonic bonding device used in the bonding method, and a cable obtained by using the bonding method.

SUMMARY

A first aspect of the present invention is a bonding method for bonding a flat cable and a bonding object together by using an ultrasonic bonding device, the flat cable having a conductor coated with a coating part, including: setting the flat cable and the bonding object between a chip attached to a horn and an anvil such that the chip and the anvil come into contact with the bonding object, the flat cable and the bonding object being pressed in such directions that the flat cable and the bonding object come close to each other, while the bonding object is ultrasonically vibrated by vibrations of the chip being in contact with the bonding object; and causing the coating part being positioned between the conductor and the bonding object to melt from heat generated by ultrasonic vibrations of the bonding object and to be removed, the conductor and the bonding object coming into contact with each other to be bonded together.

A second aspect of the present invention is as follows: in the first aspect of the present invention, the bonding object includes a plate part to be overlapped with the flat cable, and a pair of wall parts standing from both ends of the plate part such that the flat cable is positioned between the wall parts; the position of the bonding object is determined by placing the pair of wall parts between a pair of guiding parts provided in the anvil; a protrusion provided between the pair of guiding parts of the anvil presses the flat cable toward the bonding object; and the chip is made to come into contact with a face of the plate part, the face being on the opposite side from the flat cable, causing the bonding object to ultrasonically vibrate.

A third aspect of the present invention is as follows: in the first aspect of the present invention, the bonding object includes a plate part to be overlapped with the flat cable, and a pair of wall parts standing from both ends of the plate part such that the flat cable is positioned between the wall parts; a protrusion projecting from an end face of the chip is made to press the flat cable toward the bonding object; and the end face of the chip is made to come into contact with the pair of wall parts, causing the bonding object to ultrasonically vibrate.

A fourth aspect of the present invention is as follows: in any one of the first to third aspects of the present invention, the flat cable is located on the upper side of the bonding object while the flat cable and the bonding object are sandwiched between the chip and the anvil.

A fifth aspect of the present invention is an ultrasonic bonding device for bonding a flat cable and a bonding object together, the flat cable having a conductor coated with a coating part, including: a chip attached to a horn, the chip being configured to come into contact with the bonding object, causing the bonding object to ultrasonically vibrate; and an anvil configured to hold the flat cable and the bonding object between the anvil and the chip, coming into contact with the bonding object, and, in the device, the chip or the anvil has a protrusion that presses the flat cable toward the bonding object.

A sixth aspect of the present invention is as follows: in the fifth aspect of the present invention, the bonding object includes a plate part to be overlapped with the flat cable, and a pair of wall parts standing from both ends of the plate part such that the flat cable is positioned between the wall parts; the protrusion is provided in the anvil; and a pair of guiding parts is provided on both sides of the protrusion of the anvil in such a manner that the position of the bonding object is determined by placing the pair of wall parts between the pair of guiding parts.

A seventh aspect of the present invention is a cable obtained by using the bonding method for bonding a flat cable and a bonding object together, the bonding method being recited in any one of first to fourth aspects of the present invention. In the cable, the bonding object includes a plate part to be overlapped with the flat cable, and a pair of wall parts standing from both ends of the plate part such that the flat cable is positioned between the wall parts, and a conductor of the flat cable and the plate part are bonded together.

An eighth aspect of the present invention is a bonding method for bonding a flat cable and a bonding object together by using an ultrasonic bonding device, the flat cable having a conductor coated with a coating part, including: setting the flat cable and the bonding object between a chip attached to a horn and an anvil such that the flat cable and the bonding object are being pressed, while the flat cable or the bonding object is ultrasonically vibrated by vibrations of the chip; and reducing pressure applied to the flat cable and the bonding object to bond the conductor and the bonding object together, at a time when the coating part being positioned between the conductor and the bonding object is removed to make the conductor and the bonding object come into contact with each other.

A ninth aspect of the present invention is as follows: in the eighth aspect of the present invention, the flat cable is located on the upper side of the bonding object while the flat cable and the bonding object are sandwiched between the chip and the anvil.

A tenth aspect of the present invention is as follows: in the eighth or ninth aspect of the present invention, the chip is made to come into contact with the bonding object, causing the bonding object to ultrasonically vibrate.

An eleventh aspect of the present invention is as follows: in any one of the eighth to tenth aspects of the present invention, the coating part being positioned between the conductor and the bonding object is removed, thus resulting in detection of a contact between the conductor and the bonding object.

In the first, fifth, and seventh aspects of the present invention, the chip is made to come into contact with the bonding object, causing the bonding object to ultrasonically vibrate. Thus, the coating part being positioned between the conductor and the bonding object is melted to be removed effectively in a short time, by heat generated by ultrasonic vibrations of the bonding object. Accordingly, the amount of the coating part remaining between the conductor and the bonding object is reduced, enhancing strength of bonding between the conductor and the bonding object. In addition, both the chip and the anvil come into contact with the bonding object. This reduces displacement of the bonding object and the flat cable with respect to the ultrasonic bonding device.

In the second aspect of the present invention, the bonding object includes a plate part to be overlapped with the flat cable, and a pair of wall parts standing from both ends of the plate part such that the flat cable is positioned between the wall parts. This reduces displacement between the flat cable and the bonding object. In addition, the position of the bonding object is determined by placing the pair of wall parts between the pair of guiding parts provided/located in the anvil. This reduces displacement of the flat cable and the bonding object with respect to the ultrasonic bonding device. Furthermore, the chip is made to come into contact with a face of the plate part, the face being on the opposite side from the flat cable, causing the bonding object to ultrasonically vibrate. Thus, a large quantity of heat is generated by friction between the chip and the face.

In the third aspect of the present invention, the bonding object includes a plate part to be overlapped with the flat cable, and a pair of wall parts standing from both ends of the plate part such that the flat cable is positioned between the wall parts. As the flat cable is positioned between the pair of wall parts, both the chip and the anvil come into contact with the bonding object. This reduces displacement between the flat cable and the bonding object, and also reduces displacement of the flat cable and the bonding object with respect to the ultrasonic bonding device. Furthermore, an end face of the chip is made to come into contact with the pair of wall parts causing the bonding object to ultrasonically vibrate. Thus, a large quantity of heat is generated by friction between the end face of the chip and the pair of wall parts.

In the fourth aspect of the present invention, the flat cable is located on the upper side of the bonding object while the flat cable and the bonding object are sandwiched between the chip and the anvil. This prevents the melted coating part from adhering to an ultrasonic bonding device.

In the sixth aspect of the present invention, the protrusion is provided in the anvil, and a pair of guiding parts is provided on both sides of the protrusion of the anvil in such a manner that the position of the bonding object is determined by placing the pair of wall parts between the pair of guiding parts. This reduces displacement of the flat cable and the bonding object with respect to the ultrasonic bonding device.

In the eighth and eleventh aspects of the present invention, pressure applied to the flat cable and the bonding object is reduced to bond the conductor and the bonding object together, at the time when the coating part being positioned between the conductor and the bonding object is removed to make the conductor and the bonding object come into contact with each other. This reduces the amount of the coating part remaining between the conductor and the bonding object. Additionally, rupture of the conductor is prevented, and thus ultrasonic bonding is performed excellently. It is not necessary, therefore, to remove the coating part as pretreatment for ultrasonic bonding, which achieves high work efficiency.

In the ninth aspect of the present invention, the flat cable is located on the upper side of the bonding object while the flat cable and the bonding object are sandwiched between the chip and the anvil. This prevents the melted coating part from adhering to an ultrasonic bonding device.

In the tenth aspect of the present invention, the chip is made to come into contact with the bonding object, causing the bonding object to ultrasonically vibrate. Thus, the coating part being positioned between the conductor and the bonding object is melted to be removed effectively in a short time, by heat generated by ultrasonic vibrations of the bonding object.

BRIEF DESCRIPTION OF DRAWINGS

FIG. 5 is a front view of the ultrasonic bonding device shown in FIG. 4;

FIG. 7 is a front view of an ultrasonic bonding device according to a third embodiment of the present invention;

DETAILED DESCRIPTION

First Embodiment

A "bonding method for bonding a flat cable and a bonding object together" according to a first embodiment of the present invention, an "ultrasonic bonding device" used in the bonding method, and a "cable with a terminal" as a cable obtained by using the bonding method are described below with reference to FIGS. 1 to 3.

Figure 1:
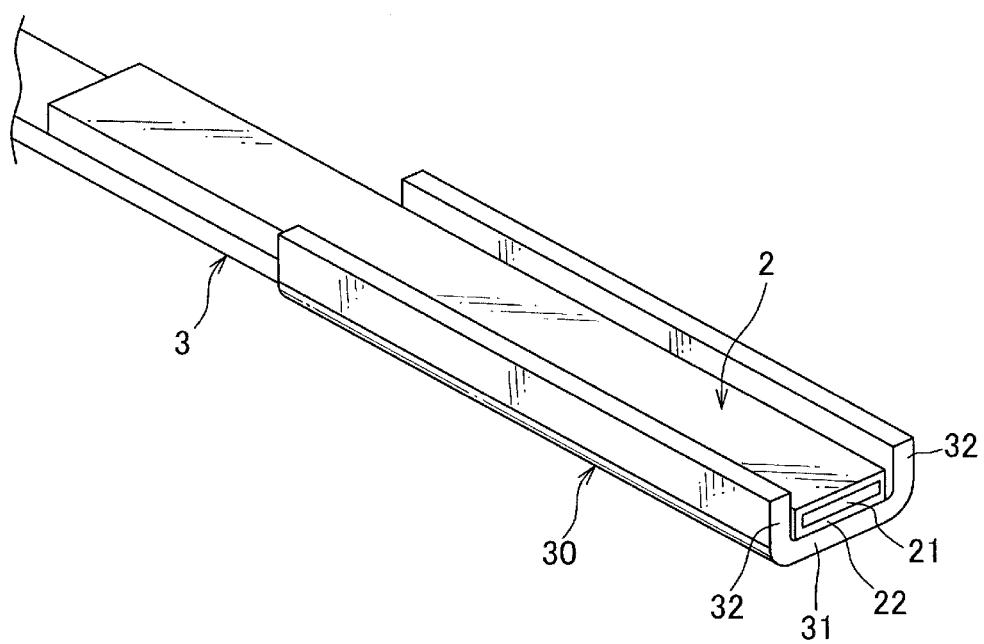
FIG. 1 is a perspective view of a flat cable and a terminal which are bonded together by a bonding method according to a first embodiment of the present invention.
Figure 2:
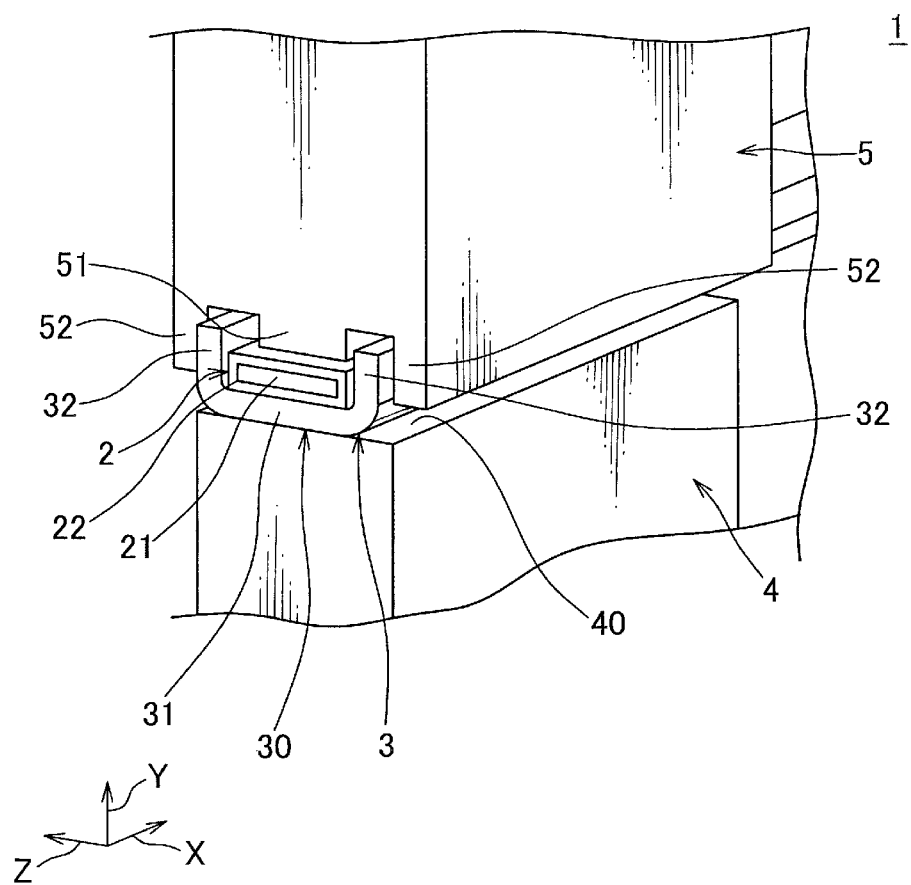
FIG. 2 is a perspective view of an ultrasonic bonding device according to the first embodiment of the present invention.
Figure 3:
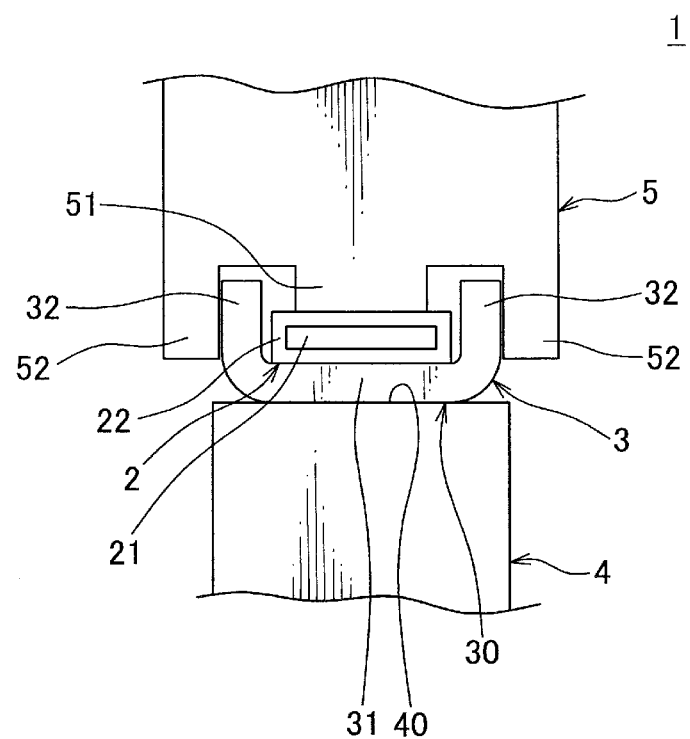
FIG. 3 is a front view of the ultrasonic bonding device shown in FIG. 2.

The "bonding method for bonding a flat cable and a bonding object together" according to the first embodiment of the present invention is a bonding method for bonding a flat cable 2 and a terminal 3 as a bonding object which are shown in FIG. 1, by using an ultrasonic bonding device 1 shown in FIGS. 2 and 3.

The flat cable 2 is a flat coated wire including a conductor 21 formed in a flat shape coated with a coating part 22 formed of an insulating synthetic resin. The flat cable 2 therefore has flexibility. The flat cable 2 is also called a flexible flat cable.

The terminal 3 is obtained by pressing a metal plate. The terminal 3 has a connecting part 30 with which the flat cable 2 is electrically connected. The connecting part 30 includes a plate part 31 on which the flat cable 2 is placed, and a pair of wall parts 32 which stands at both ends in the width direction of the plate part 31 such that the flat cable 2 is positioned between the wall parts 32.

The aforementioned "cable with a terminal" is obtained by bonding the conductor 21 of the flat cable 2 and the plate part 31 of the terminal 3 by a bonding method that will be described later.

The ultrasonic bonding device 1 includes a horn, a chip 4 attached to the horn, an anvil 5 facing the chip 4 in the Y axis direction, and a driving mechanism. The chip 4 is moved in the Y axis direction by the driving mechanism via the horn. The chip 4 is also ultrasonically vibrated in the directions of axes X and Z which are orthogonal to the Y axis direction by the driving mechanism via the horn.

The chip 4 is formed in a quadrangular-prism shape, having a flat end face 40 facing the anvil 5, and four side faces perpendicular to the end face 40. A length of the chip 4 in the X axis direction is larger than the length in the Z axis direction which is orthogonal to the axes Y and X. The chip 4 is placed directly below the anvil 5.

The anvil 5 has a protrusion 51 which presses the flat cable 2 toward the terminal 3, and a pair of guiding parts 52 between which the pair of wall parts 32 is placed to determine the position of the terminal 3. The protrusion 51 is provided in the anvil 5 on the side facing the chip 4 and centrally positioned in the Z axis direction. The pair of guiding parts 52 is provided on both sides of the protrusion 51, in the Z axis direction.

The following is a description of the bonding method for bonding the flat cable 2 and the terminal 3 by using the ultrasonic bonding device 1. First, the flat cable 2 and the terminal 3 are positioned at the anvil 5, with the chip 4 separated from the anvil 5. At this time, the flat cable 2 is placed on the terminal 3 as shown in FIG. 1, and the positions of the terminal 3 and the flat cable 2 are determined by placing the pair of wall parts 32 between the pair of guiding parts 52. In this state, the protrusion 51 of the anvil 5 is being in contact with the flat cable 2. Concurrently with that, the pair of guiding parts 52 of the anvil 5 is being in contact with the pair of wall parts 32 of the terminal 3.

Subsequently, the chip 4 is moved closer to the anvil 5 such that the flat cable 2 and the terminal 3 are sandwiched between the chip 4 and the anvil 5. Concurrently with that, the chip 4 and the anvil 5 come into contact with the terminal 3. Then, the flat cable 2 and the terminal 3 are pressed so as to be moved close to each other, while the chip 4 is ultrasonically vibrated in the X and Z axes directions. In this state, the end face 40 of the chip 4 is being in contact with a face of the plate part 31 on the opposite side from the flat cable 2. When the chip 4 ultrasonically vibrates, therefore, vibrations of the chip 4 propagate to the terminal 3, causing the terminal 3 to ultrasonically vibrate.

When the terminal 3 ultrasonically vibrates, heat is generated in the plate part 31 by friction between the chip 4 and the plate part 31. The heat is transmitted to the entire connecting part 30, and then the coating part 22 being positioned between the conductor 21 and the plate part 31 melts from the heat. Concurrently with that, the protrusion 51 presses the flat cable 2 toward the terminal 3. Thus, the coating part 22 being positioned between the conductor 21 and the plate part 31 is, when melted, pressed out (that is, removed) from a space between the conductor 21 and the plate part 31. Thereby the conductor 21 and the plate part 31 come into contact with each other, resulting in a solid-phase bonding together.

As described above, the chip 4 comes into contact with the terminal 3 to cause the terminal 3 to ultrasonically vibrate, thereby generating heat. The coating part 22 being positioned between the conductor 21 and the plate part 31 is melted to be removed effectively in a short time by the heat. Accordingly, the amount of the coating part 22 remaining between the conductor 21 and the plate part 31 is reduced, which enhances strength of bonding between the conductor 21 and the terminal 3.

In addition, the flat cable 2 is positioned between the pair of wall parts 32, while the pair of wall parts 32 is positioned between the pair of guiding parts 52. Moreover, both the chip 4 and the anvil 5 come into contact with the terminal 3. As a result, displacement between the flat cable 2 and the terminal 3 is reduced, and also displacement of the flat cable 2 and the terminal 3 with respect to the ultrasonic bonding device 1 is reduced as well. Accordingly, the conductor 21 and the terminal 3 are bonded together in a precise manner, at particular portions thereof in which bonding is required to be performed. This enhances strength of bonding between the conductor 21 and the terminal 3.

Furthermore, when the flat cable 2 and the terminal 3 are sandwiched between the chip 4 and the anvil 5, the flat cable 2 is located on the upper side of the terminal 3. This prevents the melted coating part 22 from adhering to the ultrasonic bonding device 1.

Second Embodiment

Figure 4:
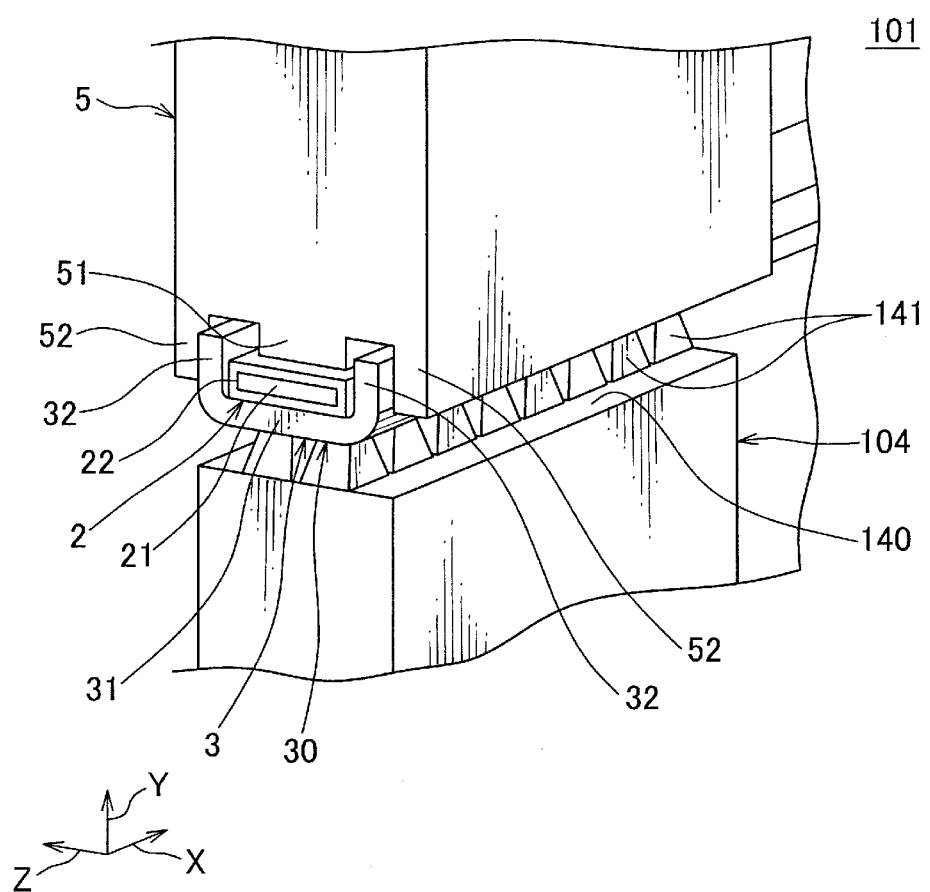
FIG. 4 is a perspective view of an ultrasonic bonding device according to a second embodiment of the present invention.
Figure 6:
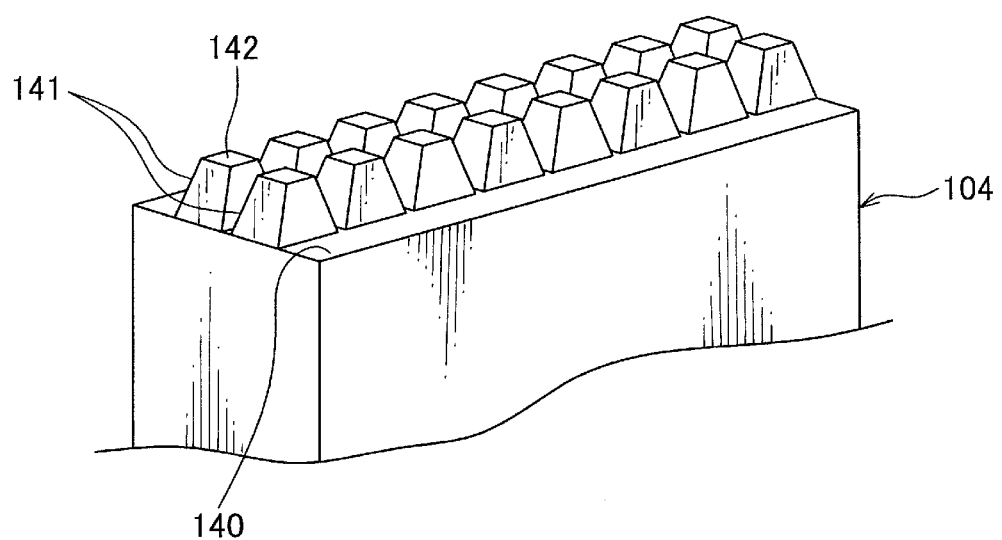
FIG. 6 is a perspective view of a chip shown in FIG. 4.

A "bonding method for bonding a flat cable and a bonding object together" according to a second embodiment of the present invention, an "ultrasonic bonding device" used in the bonding method, and a "cable with a terminal" as a cable obtained by using the bonding method are described below with reference to FIGS. 4 to 6. In FIGS. 4 to 6, a component which is the same as that in the first embodiment described above is indicated by the same reference sign as used in the first embodiment, and will not be defined in a repetitive manner.

The "bonding method for bonding a flat cable and a bonding object together" according to the second embodiment of the present invention is a bonding method for bonding the flat cable 2 and the terminal 3 as the bonding object which have been previously described, by using an ultrasonic bonding device 101 shown in FIGS. 4 and 5. The aforementioned "cable with a terminal" is obtained by bonding the conductor 21 of the flat cable 2 and the plate part 31 of the terminal 3 by a bonding method that will be described later.

The ultrasonic bonding device 101 includes the chip 104 shown in FIG. 6 instead of the chip 4 included in the ultrasonic bonding device 1 of the first embodiment. The rest of the configuration of the ultrasonic bonding device 101 is the same as the ultrasonic bonding device 1 of the first embodiment.

The chip 104 is formed in a quadrangular-prism shape having a flat end face 140 facing the anvil 5. The chip 104 also has a plurality of protrusions 141 projecting from the end face 140. Each of the protrusions 141 has a flat surface 142 at the end thereof. A groove having a V-shaped section is formed between neighboring protrusions 141. The chip 104 is formed of a metal material. The protrusion 141 is formed integrally with the other parts.

In addition to the above, the present embodiment of the invention may have a configuration in which the protrusion 141 is formed separately from the other parts and then attached to the end face 140. In this case, the protrusion 141 may be formed of a material different from a material for the other parts. A material forming the protrusion 141 may be a metal or a synthetic resin such as silicone. When formed of silicone, the protrusion 141 is more resistant to abrasion and has higher vibration durability than when the protrusion 141 is made of metal.

The bonding method for bonding the flat cable 2 and the terminal 3 by using the ultrasonic bonding device 101 is similar to the method of the first embodiment. First, the flat cable 2 and the terminal 3 are positioned at the anvil 5 so that the flat cable 2 and the terminal 3 are sandwiched between the chip 104 and the anvil 5. Concurrently with that, the chip 104 and the anvil 5 come into contact with the terminal 3. Then, the flat cable 2 and the terminal 3 are pressed so as to be moved close to each other, while the chip 104 is ultrasonically vibrated in the X and Z axes directions. In this state, the protrusion 141 of the chip 104 is being in contact with a face of the plate part 31 on the opposite side from the flat cable 2. When the chip 104 ultrasonically vibrates, therefore, vibrations of the chip 104 propagate to the terminal 3 via the protrusion 141, causing the terminal 3 to ultrasonically vibrate. When the terminal 3 ultrasonically vibrates, frictional heat is generated in a contact portion of the terminal 3 which is being in contact with the chip 104. Then, the coating part 22 being positioned between the conductor 21 and the plate part 31 melts from the heat and is removed. Thereby the conductor 21 and the plate part 31 come into contact with each other, resulting in a solid-phase bonding together.

In this embodiment, as in the first embodiment, the chip 104 comes into contact with the terminal 3 to cause the terminal 3 to ultrasonically vibrate. As a result, strength of bonding between the conductor 21 and the terminal 3 is enhanced. In addition, both the chip 104 and the anvil 5 come into contact with the terminal 3, which reduces displacement. Accordingly, the conductor 21 and the terminal 3 are bonded together in a precise manner, at particular portions thereof in which bonding is required to be performed.

Third Embodiment

A "bonding method for bonding a flat cable and a bonding object together" according to a third embodiment of the present invention, an "ultrasonic bonding device" used in the bonding method, and a "cable with a terminal" as a cable obtained by using the bonding method are described below with reference to FIG. 7. In FIG. 7, a component which is the same as that in the first to second embodiments described above is indicated by the same reference sign as used in the first to second embodiments, and will not be defined in a repetitive manner.

The "bonding method for bonding a flat cable and a bonding object together" according to the third embodiment of the present invention is, as shown in FIG. 7, a bonding method for bonding the flat cable 2 and the terminal 203 as the bonding object by using an ultrasonic bonding device 201. The aforementioned "cable with a terminal" is obtained by bonding the conductor 21 of the flat cable 2 and the terminal 203 by a bonding method that will be described later. In the terminal 203, a part to which the conductor 21 of the flat cable 2 is bonded has a flat plate shape.

The ultrasonic bonding device 201 includes a horn, a chip 4 attached to the horn, an anvil 205 facing the chip 4 in the Y axis direction, and a driving mechanism. The chip 4 is moved in the Y axis direction by the driving mechanism via the horn. The chip 4 is also ultrasonically vibrated in the X and Z axes directions which are orthogonal to the Y axis direction by the driving mechanism via the horn.

The anvil 205 has a protrusion 51 which presses the flat cable 2 toward the terminal 203, and a pair of holding parts 252 which is being in contact with the terminal 203. The flat cable 2 is positioned between the pair of holding parts 252. The pair of holding parts 252 is provided on both sides of the protrusion 51, in the Z axis direction.

The following is a description of the bonding method for bonding the flat cable 2 and the terminal 203 by using the ultrasonic bonding device 201. First, the flat cable 2 and the terminal 203 are positioned at the anvil 205, with the chip 4 separated from the anvil 205. At this time, the flat cable 2 and the terminal 203 are positioned at the anvil 205 in such a manner that the flat cable 2 is placed on the terminal 203.

Subsequently, the chip 4 is moved closer to the anvil 205 so that the flat cable 2 and the terminal 203 are sandwiched between the chip 4 and the anvil 205. Concurrently with that, the chip 4 and the anvil 205 come into contact with the terminal 203. Then, the flat cable 2 and the terminal 203 are pressed so as to be moved close to each other, while the chip 4 is ultrasonically vibrated in the X and Z axes directions. In this state, the end face 40 of the chip 4 is being in contact with a face of the terminal 203 on the opposite side from the flat cable 2. When the chip 4 ultrasonically vibrates, therefore, vibrations of the chip 4 propagate to the terminal 203, causing the terminal 203 to ultrasonically vibrate. When the terminal 203 ultrasonically vibrates, frictional heat is generated in a contact portion of the terminal 203 which is being in contact with the chip 4. Then, the coating part 22 being positioned between the conductor 21 and the terminal 203 melts from the heat and is removed. Thereby the conductor 21 and the terminal 203 come into contact with each other, resulting in a solid-phase bonding together.

In this embodiment, the chip 4 comes into contact with the terminal 203 to cause the terminal 203 to ultrasonically vibrate, thereby generating heat. The coating part 22 being positioned between the conductor 21 and the terminal 203 is melted to be removed effectively in a short time by the heat. Accordingly, the amount of the coating part 22 remaining between the conductor 21 and the terminal 203 is reduced, which enhances strength of bonding between the conductor 21 and the terminal 203. In addition, the flat cable 2 is positioned between the pair of holding parts 252. Moreover, both the chip 4 and the anvil 205 come into contact with the terminal 203. As a result, displacement between the flat cable 2 and the terminal 203 is reduced, and also displacement of the flat cable 2 and the terminal 203 with respect to the ultrasonic bonding device 201 is reduced as well. Accordingly, the conductor 21 and the terminal 203 are bonded together in a precise manner, at particular portions thereof in which bonding is required to be performed. This enhances strength of bonding between the conductor 21 and the terminal 203.

Fourth Embodiment

Figure 8:
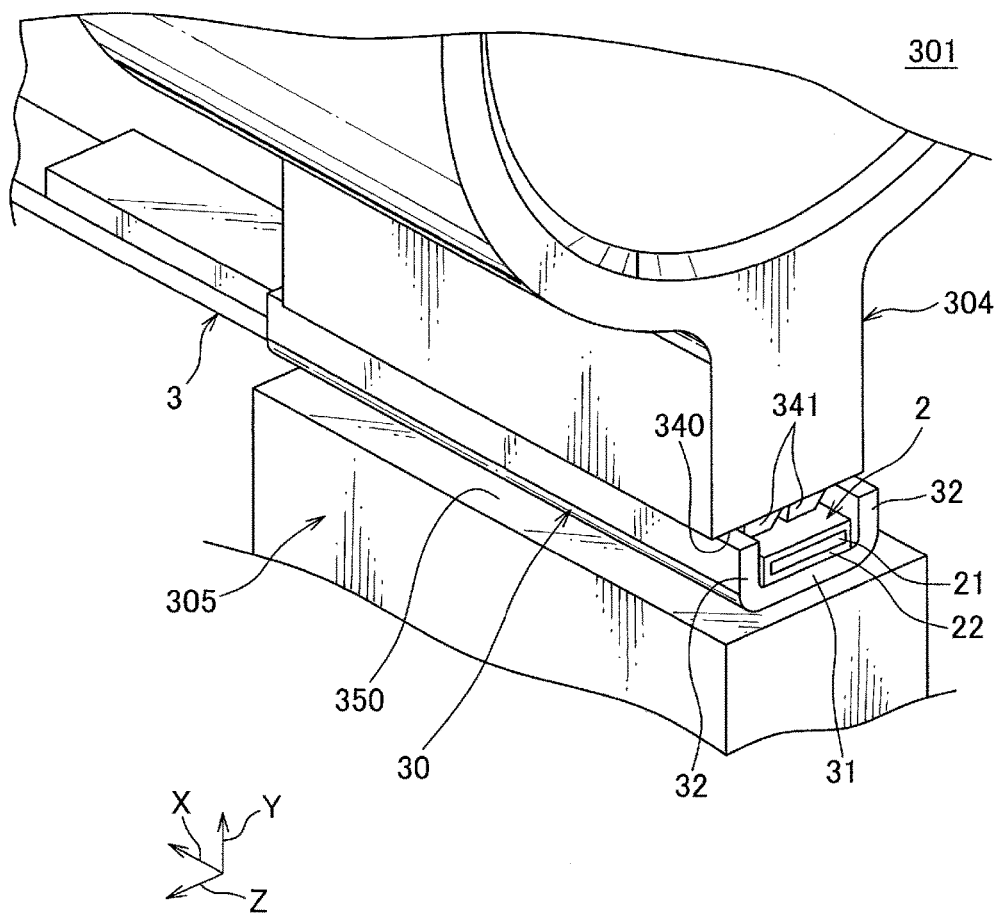
FIG. 8 is a perspective view of an ultrasonic bonding device according to a fourth embodiment of the present invention.
Figure 9:
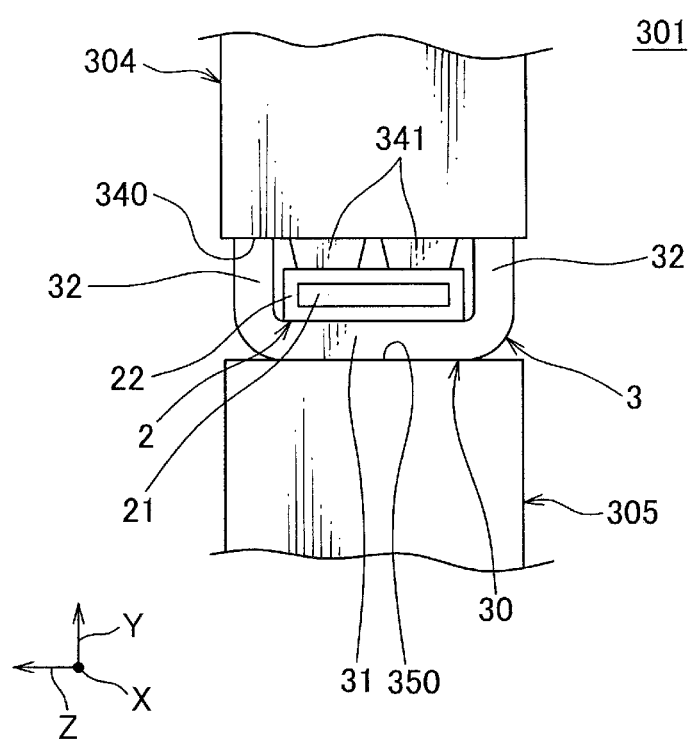
FIG. 9 is a front view of the ultrasonic bonding device shown in FIG. 8.

A "bonding method for bonding a flat cable and a bonding object together" according to a fourth embodiment of the present invention, an "ultrasonic bonding device" used in the bonding method, and a "cable with a terminal" as a cable obtained by using the bonding method are described below with reference to FIGS. 8 to 9. In FIGS. 8 to 9, a component which is the same as that in the first to third embodiments described above is indicated by the same reference sign as used in the first to third embodiments, and will not be defined in a repetitive manner.

The "bonding method for bonding a flat cable and a bonding object together" according to the fourth embodiment of the present invention is a bonding method for bonding the flat cable 2 and the terminal 3 as the bonding object which have been previously described, by using an ultrasonic bonding device 301 shown in FIGS. 8 and 9. The aforementioned "cable with a terminal" is obtained by bonding the conductor 21 of the flat cable 2 and the plate part 31 of the terminal 3 by a bonding method that will be described later.

The ultrasonic bonding device 301 includes a horn, a chip 304 attached to the horn, an anvil 305 facing the chip 304 in the Y axis direction, and a driving mechanism. The chip 304 is moved in the Y axis direction by the driving mechanism via the horn. The chip 304 is also ultrasonically vibrated in the X and Z axes directions which are orthogonal to the Y axis direction by the driving mechanism via the horn. In the embodiment, the chip 304 is placed directly above the anvil 305. The anvil 305 has a flat supporting surface 350 facing the chip 304.

The chip 304 is formed in a quadrangular-prism shape having a flat end face 340 facing the anvil 305. The chip 304 also has a plurality of protrusions 341 projecting from the end face 340. Each of the protrusions 341 has a flat surface at the end thereof. A groove having a V-shaped section is formed between neighboring protrusions 341. The chip 304 is formed of a metal material. The protrusion 341 is formed integrally with the other parts. In addition to the above, the present embodiment of the invention may have a configuration in which the protrusion 341 is formed separately from the other parts and then attached to the end face 340. In this case, the protrusion 341 may be formed of a material different from a material for the other parts. A material forming the protrusion 341 may be a metal or a synthetic resin such as silicone.

The following is a description of the bonding method for bonding the flat cable 2 and the terminal 3 by using the ultrasonic bonding device 301. First, the flat cable 2 and the terminal 3 are positioned at the anvil 305, with the chip 304 separated from the anvil 305. At this time, the flat cable 2 and the terminal 3 are positioned at the anvil 305 in such a manner that the flat cable 2 is placed on the terminal 3.

Subsequently, the chip 304 is moved closer to the anvil 305 so that the flat cable 2 and the terminal 3 are sandwiched between the chip 304 and the anvil 305. Concurrently with that, the chip 304 and the anvil 305 come into contact with the terminal 3. Then, the flat cable 2 and the terminal 3 are pressed so as to be moved close to each other, while the chip 304 is ultrasonically vibrated in the X and Z axes directions. In this state, the end face 340 of the chip 304 is being in contact with an end face of a pair of wall parts 32. When the chip 304 ultrasonically vibrates, therefore, vibrations of the chip 304 propagate to the terminal 3, causing the terminal 3 to ultrasonically vibrate.

When the terminal 3 ultrasonically vibrates, heat is generated in the pair of wall parts 32 by friction between the chip 304 and the pair of wall parts 32. The heat is transmitted to the entire connecting part 30, and then a coating part 22 being positioned between the conductor 21 and the plate part 31 melts from the heat. Concurrently with that, the protrusions 341 press the flat cable 2 toward the terminal 3. Thus, the coating part 22 being positioned between the conductor 21 and the plate part 31 is, when melted, pressed out (that is, removed) from a space between the conductor 21 and the plate part 31. Thereby the conductor 21 and the plate part 31 come into contact with each other, resulting in a solid-phase bonding together.

In this embodiment, the chip 304 comes into contact with the terminal 3 to cause the terminal 3 to ultrasonically vibrate and thereby to generate heat. The coating part 22 being positioned between the conductor 21 and the plate part 31 is melted to be removed effectively in a short time by the heat. Accordingly, the amount of the coating part 22 remaining between the conductor 21 and the plate part 31 is reduced, which enhances strength of bonding between the conductor 21 and the terminal 3. In addition, the flat cable 2 is positioned between the pair of wall parts 32. Moreover, both the chip 304 and the anvil 305 come into contact with the terminal 3. As a result, displacement between the flat cable 2 and the terminal 3 is reduced, and also displacement of the flat cable 2 and the terminal 3 with respect to the ultrasonic bonding device 301 is reduced as well. Accordingly, the conductor 21 and the terminal 3 are bonded together in a precise manner, at particular portions thereof in which bonding is required to be performed. This enhances strength of bonding between the conductor 21 and the terminal 3. In the chip 304, a groove having a V-shaped section is formed between neighboring protrusions 341. The melted coating part 22 is discharged to the outside of the chip 304 via the groove.

Fifth Embodiment

A "bonding method for bonding a flat cable and a bonding object together" according to a fifth embodiment of the present invention is described below with reference to FIGS. 10 to 15. The "bonding method for bonding a flat cable and a bonding object together" according to the present embodiment is a bonding method for bonding the flat cable 2 and a terminal 3 as the bonding object shown in FIG. 1, by using an ultrasonic bonding device 401 shown in FIGS. 10 and 11.

The ultrasonic bonding device 401 includes a horn, a chip 404 attached to the horn, an anvil 405 facing the chip 404 in the Y axis direction, and a driving mechanism. The chip 404 is moved in the Y axis direction by the driving mechanism via the horn. The chip 404 is also ultrasonically vibrated in the X and Z axes directions which are orthogonal to the Y axis direction by the driving mechanism via the horn.

Figure 11:
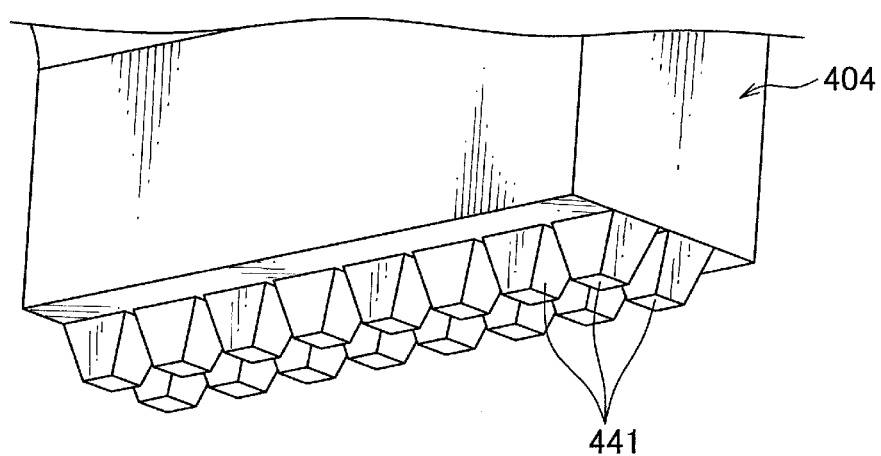
FIG. 11 is a perspective view of the chip shown in FIG. 10.

As shown in FIG. 11, the chip 404 has, at the end thereof, a plurality of protrusions 441. A groove having a V-shaped section is formed between neighboring protrusions 441. The chip 404 is placed directly above the anvil 405.

The following is a description of the bonding method for bonding the flat cable 2 and the terminal 3 by using the ultrasonic bonding device 401.

Figure 10:
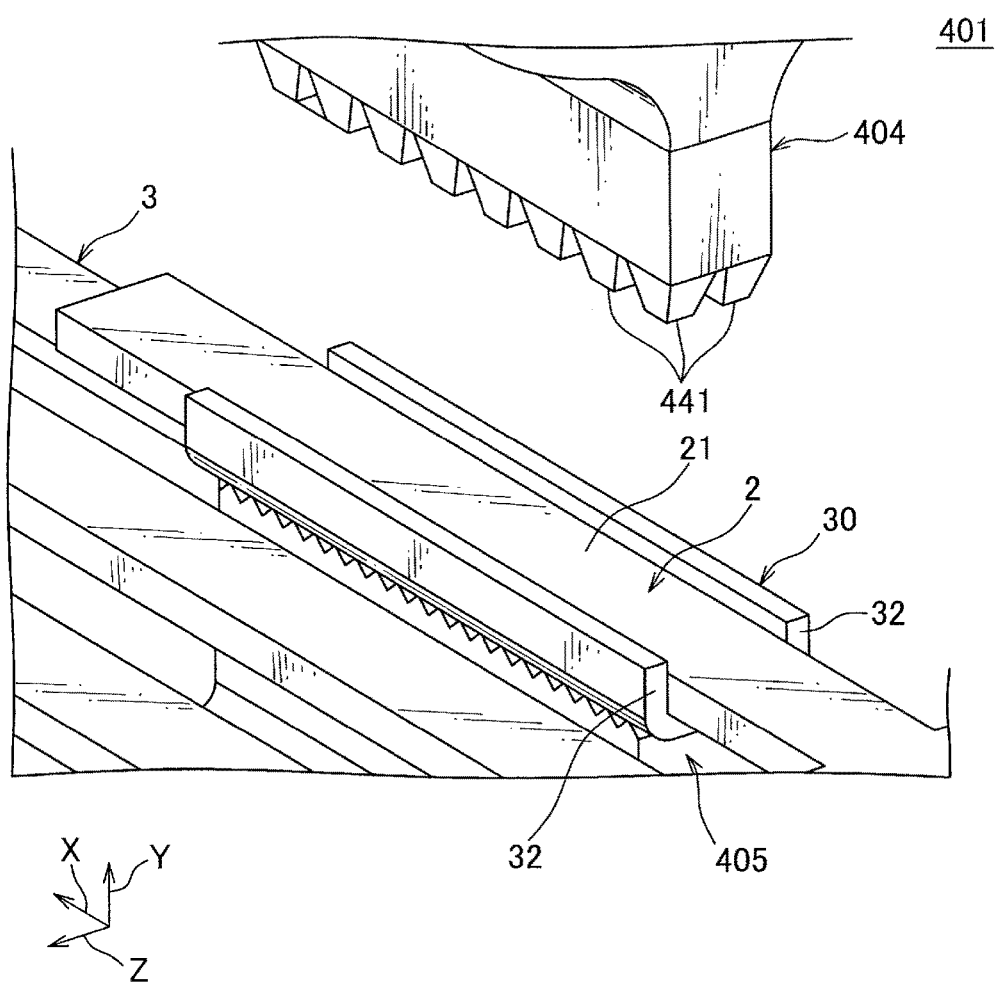
FIG. 10 is a perspective view of the flat cable and the terminal shown in FIG. 1, showing how the flat cable and the terminal are bonded together by using the ultrasonic bonding device and by a bonding method according to a fifth embodiment of the present invention.

First, as shown in FIG. 10, the flat cable 2 and the terminal 3 are positioned at the anvil 405, with the chip 404 separated from the anvil 405. At this time, the flat cable 2 is placed on the plate part 31, being positioned between the pair of wall parts 32. This reduces displacement between the flat cable 2 and the terminal 3. Accordingly, the conductor 21 and the terminal 3 are bonded together in a precise manner, at particular portions thereof in which bonding is required to be performed. In addition, adhesion of the coating part 22, which melts at the time of bonding, to the ultrasonic bonding device 401 is prevented.

Figure 12:
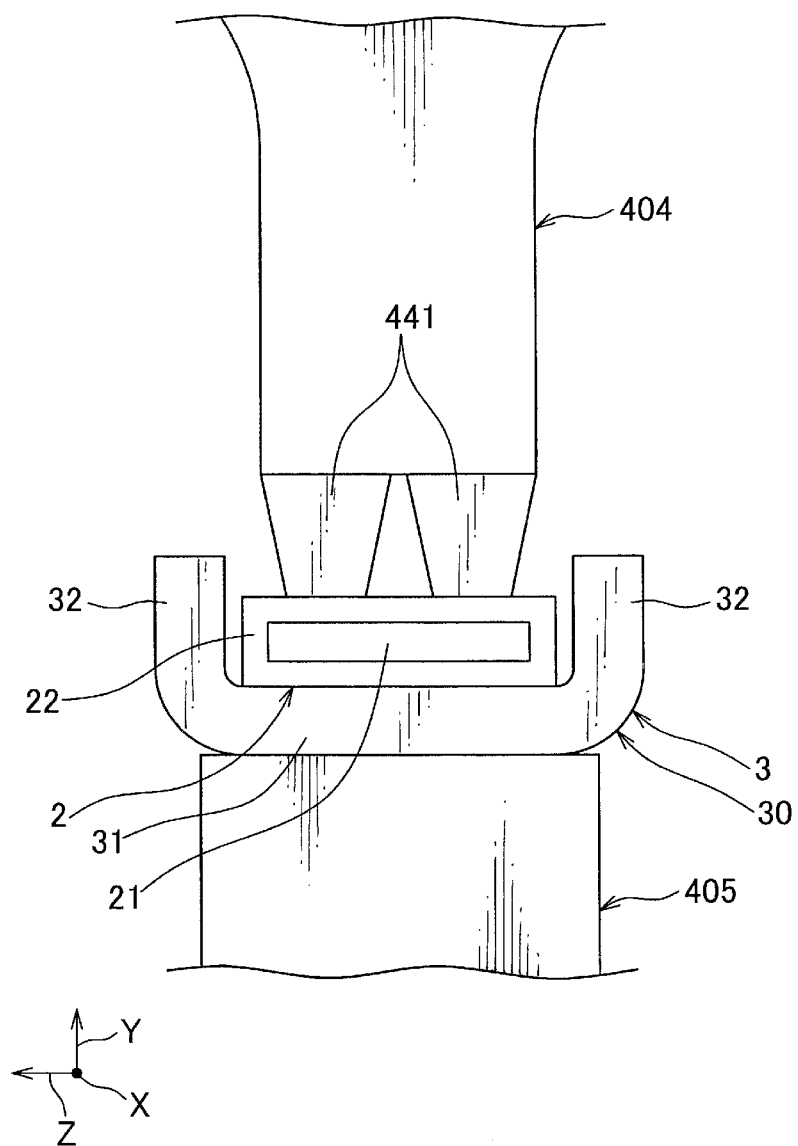
FIG. 12 is a front view showing that the chip shown in FIG. 10 is being in contact with the flat cable, and ultrasonic bonding has started.

Subsequently, the chip 404 is moved closer to the anvil 405 so that the protrusion 441 comes into contact with the flat cable 2. Simultaneously, the flat cable 2 and the terminal 3 are sandwiched between the chip 404 and the anvil 405. Then, as shown in FIG. 12, the chip 404 is moved still closer to the anvil 405. Thereby the flat cable 2 and the terminal 3 are pressed so as to be moved close to each other. Concurrently with that, the chip 404 is ultrasonically vibrated in the X and Z axes directions.

When the chip 404 ultrasonically vibrates, vibrations of the chip 404 are transmitted to the flat cable 2 via the protrusion 441, causing the flat cable 2 to ultrasonically vibrate. When the flat cable 2 ultrasonically vibrates, frictional heat is generated in a contact portion of the flat cable 2 which is being in contact with the chip 404. Then, the coating part 22 starts to melt from the heat. Concurrently with that, the protrusion 441 presses the flat cable 2 toward the terminal 3. Thus, the coating part 22 being positioned between the conductor 21 and the plate part 31 is, when melted, pressed out from a space between the conductor 21 and the plate part 31. In addition, as a groove having a V-shaped section is formed between neighboring protrusions 441 of the chip 404, the melted coating part 22 enters the groove and is then scraped out from the groove to be discharged to the outside of the chip 404. When the coating part 22 being positioned between the conductor 21 and the plate part 31 is removed, the conductor 21 and the plate part 31 come into contact with each other as shown in FIG. 13.

Figure 14:
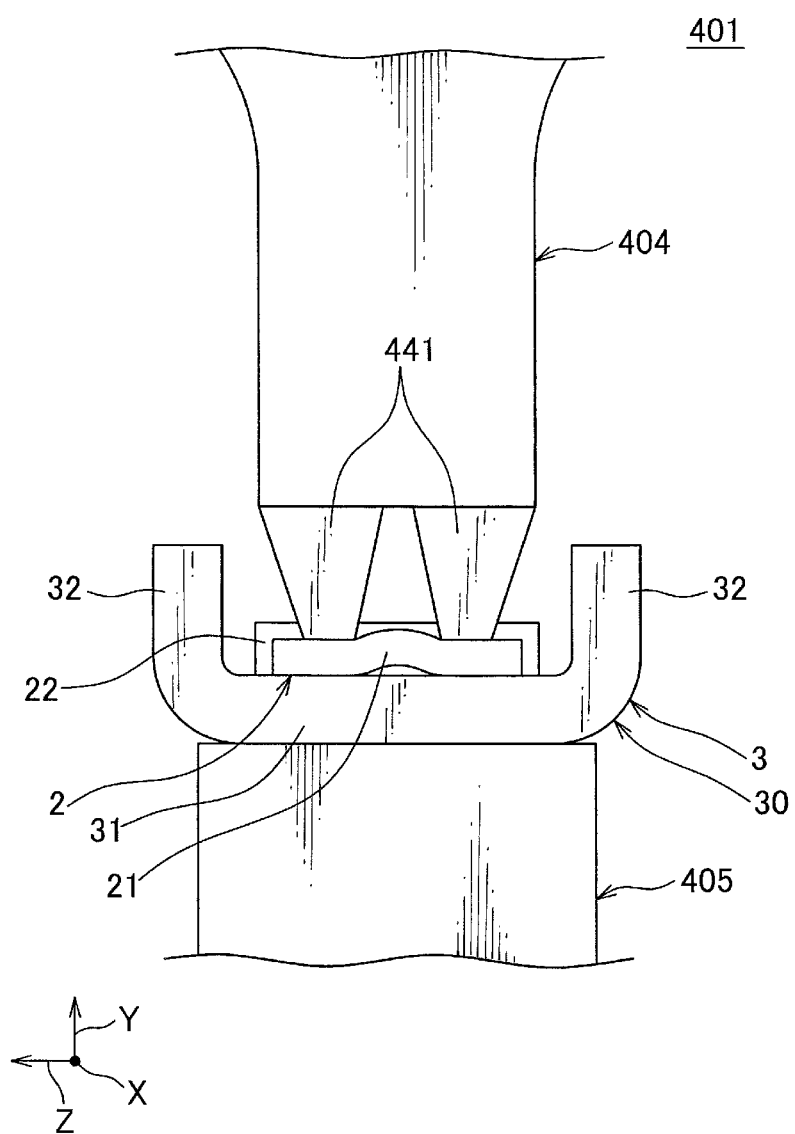
FIG. 14 is a front view showing that the conductor of the flat cable and the terminal shown in FIG. 13 are bonded together, and ultrasonic bonding has finished.

Furthermore, in the present embodiment, contact between the conductor 21 and the plate part 31, caused by removal of the coating part 22 being positioned between the conductor 21 and the plate part 31, is detected. When the contact between the conductor 21 and the plate part 31 is detected, pressure applied to the flat cable 2 and the terminal 3 (pressing force of the chip 404) is reduced. Subsequently, the chip 404 is ultrasonically vibrated for a specified period with the pressing force thereof reduced. Then, as shown in FIG. 14, the conductor 21 and the plate part 31 are solid-phase bonded together. As a result of intensive researches conducted by the inventors of the present invention, it was found that there is a difference between the value of the pressure required for the removal of the coating part 22 and the value of the pressure required for metal bonding, and, therefore, the conductor 21 and the plate part 31 are solid-phase bonded together even at a lower pressure than the pressure applied at the time of the removal of the coating part 22.

Figure 13:
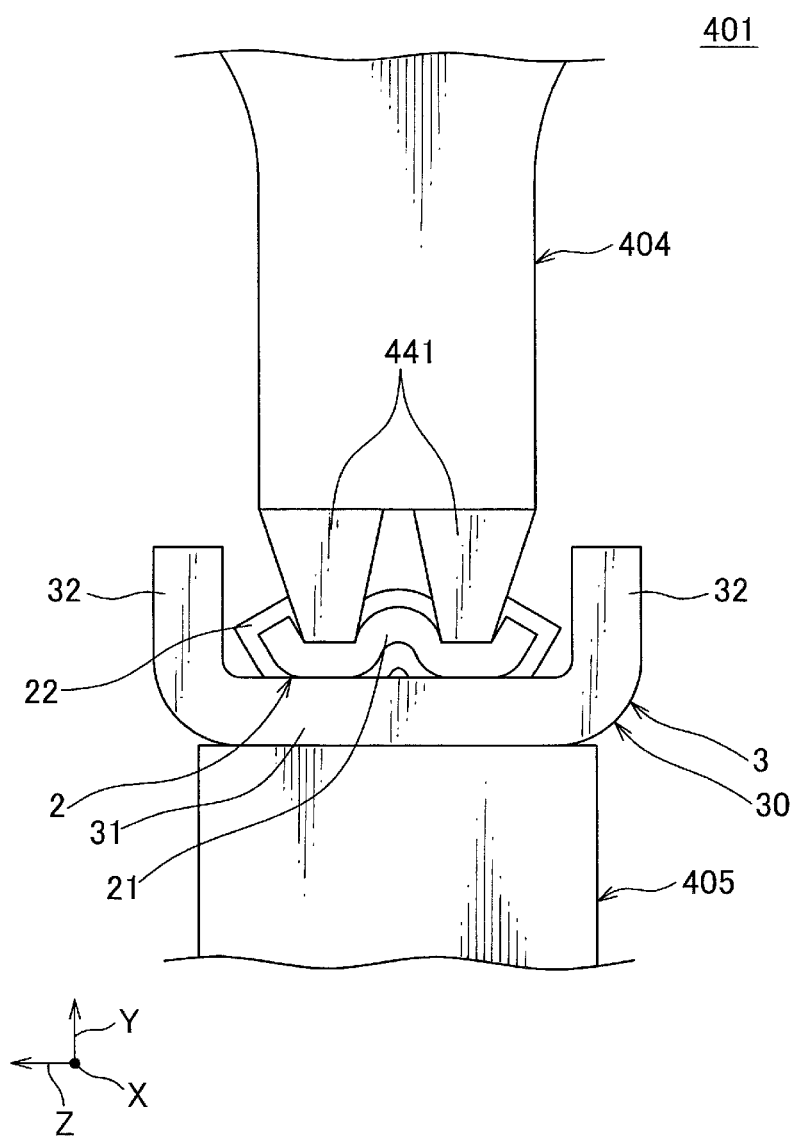
FIG. 13 is a front view showing that the conductor of the flat cable and the terminal shown in FIG. 12 are in contact with each other.
Figure 15:
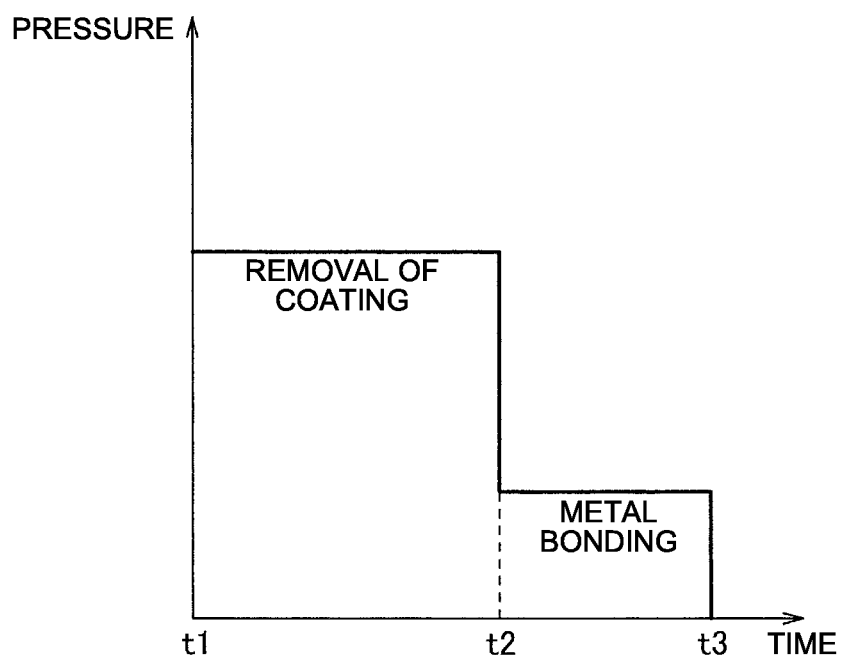
FIG. 15 is a graph showing changes with time of pressure applied to the flat cable and the terminal by the ultrasonic bonding device shown in FIGS. 12 to 14.

FIG. 15 is a graph showing changes with time of pressure applied to the flat cable 2 and the terminal 3 by the ultrasonic bonding device 401 shown in FIGS. 12 to 14. In FIG. 15, a timing at which the chip 404 comes into contact with the flat cable 2 and ultrasonic bonding starts, as shown in FIG. 12, is indicated by t1. A timing at which the conductor 21 and the plate part 31 come into contact with each other, as shown in FIG. 13, is indicated by t2. A timing at which the conductor 21 and the plate part 31 are bonded together and ultrasonic bonding has finished, as shown in FIG. 14, is indicated by t3. In other words, during the period from t1 to t2, removal of the coating part 22 is performed. In the period, therefore, the pressure applied to the flat cable 2 and the terminal 3 by the ultrasonic bonding device 401 is set higher. During the period from t2 to t3, metal bonding between the conductor 21 and the plate part 31 is performed. In the period, therefore, the pressure applied to the flat cable 2 and the terminal 3 by the ultrasonic bonding device 401 is set lower than the pressure set in the period from t1 to t2.

In the present embodiment, contact between the conductor 21 and the plate part 31 is detected by detecting transmission of ultrasonic energy generated in the horn to the conductor 21 and the terminal 3. As another contact detection method, for example, the contact between the conductor 21 and the plate part 31 is detected based on the change in electrical resistance caused by applying a voltage to the conductor 21 and the terminal 3 when the ultrasonic bonding is started. Further, the ultrasonic bonding device 401 may be controlled by setting duration of the period from the time the ultrasonic bonding is started until the time when the conductor 21 and the plate part 31 come into contact with each other. Such duration is obtained in advance.

In the above-described bonding method, pressure applied to the flat cable 2 and the terminal 3 is reduced to bond the conductor 21 and the plate part 31 together, when the coating part 22 being positioned between the conductor 21 and the plate part 31 has been removed to make the conductor 21 and the plate part 31 come into contact with each other. This reduces the amount of the coating part 22 remaining between the conductor 21 and the plate part 31. Additionally, rupture of the conductor 21 is prevented, and thus ultrasonic bonding can be performed excellently. It is not necessary, therefore, to remove the coating part 22 as pretreatment for ultrasonic bonding, which achieves high work efficiency.

Further, in the above-described bonding method, the flat cable 2 is located on the upper side of the terminal 3, when the flat cable 2 and the terminal 3 are sandwiched between the chip 404 and the anvil 405. This prevents the coating part 22 which have been melted at the time of the bonding from adhering to the ultrasonic bonding device 401.

Sixth Embodiment

Figure 16:
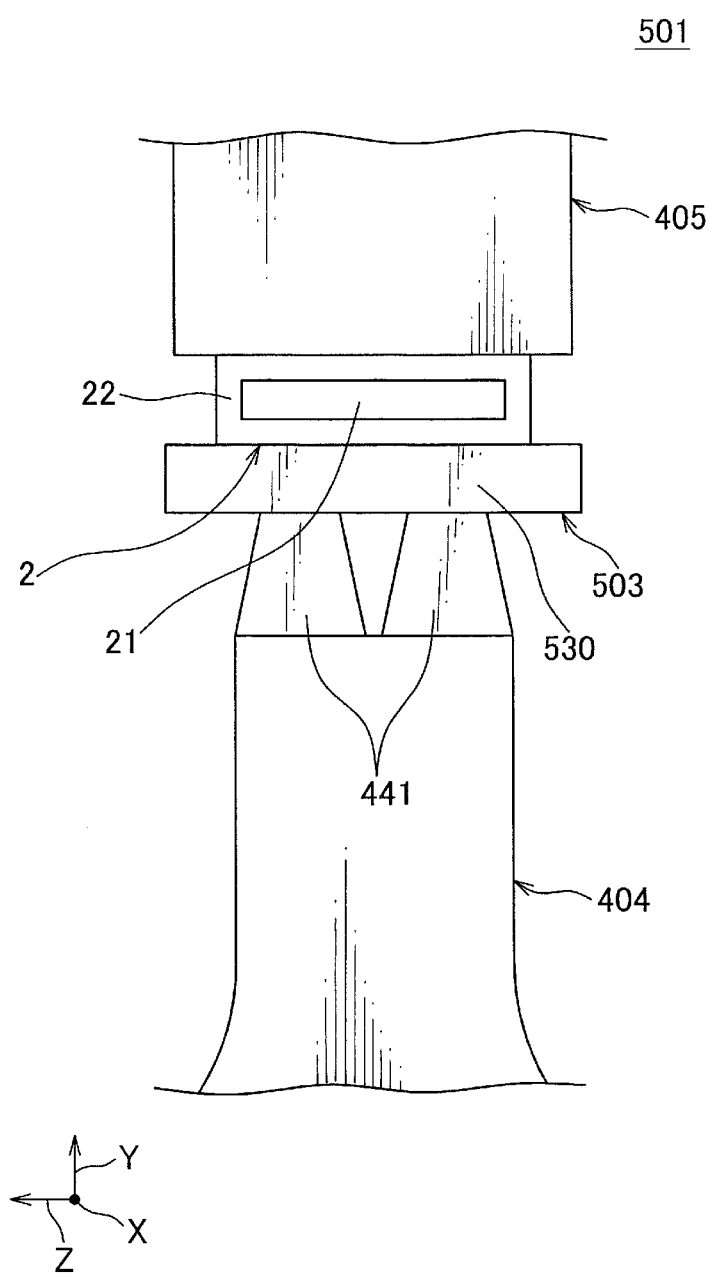
FIG. 16 is a front view of an ultrasonic bonding device used in a bonding method according to a sixth embodiment of the present invention.

A "bonding method for bonding a flat cable and a bonding object together" according to a sixth embodiment of the present invention is described below with reference to FIG. 16. The "bonding method for bonding a flat cable and a bonding object together" according to the present embodiment is a bonding method for bonding the flat cable 2 and a terminal 503 as the bonding object which are shown in FIG. 16, by using an ultrasonic bonding device 501 also shown in FIG. 16. In FIG. 16, a component which is the same as that in the fifth embodiment described above is indicated by the same reference sign as used in the fifth embodiment, and will not be defined in a repetitive manner.

In the present embodiment, configuration of the flat cable 2 is the same as that of the fifth embodiment. The terminal 503 has a flat connecting part 530. Specifically, the connecting part 530 has the same configuration as the plate part 31 only, or in other words, as the terminal 3 excluding the pair of wall parts 32 described in the fifth embodiment.

In the ultrasonic bonding device 501, relative positions between the chip 404 and the anvil 405 are opposite from those in the fifth embodiment. That is, the chip 404 is placed directly below the anvil 405.

The following is a description of the bonding method for bonding the flat cable 2 and the terminal 503 by using the ultrasonic bonding device 501.

First, the flat cable 2 and the terminal 503 are positioned directly below the anvil 405, with the chip 404 separated from the anvil 405. At this time, the flat cable 2 is placed on the connecting part 530. This prevents the coating part 22 which melts at the time of the bonding from adhering to the ultrasonic bonding device 501.

Subsequently, the chip 404 is moved closer to the anvil 405 so that the protrusion 441 comes into contact with the connecting part 530. Simultaneously, the flat cable 2 and the terminal 503 are sandwiched between the chip 404 and the anvil 405. Then, the chip 404 is moved still closer to the anvil 405. Thereby the flat cable 2 and the terminal 503 are pressed so as to be moved close to each other. Concurrently with that, the chip 404 is ultrasonically vibrated in the X and Z axes directions.

When the chip 404 ultrasonically vibrates, vibrations of the chip 404 propagate to the connecting part 530 via the protrusion 441, causing the terminal 503 to ultrasonically vibrate. When the terminal 503 ultrasonically vibrates, heat is generated in the connecting part 530 by friction between the chip 404 and the connecting part 530. The heat is transmitted to the entire connecting part 530, and then the coating part 22 starts to melt from the heat. Concurrently with that, the flat cable 2 is pressed toward the terminal 503. Thus, the coating part 22 being positioned between the conductor 21 and the connecting part 530 is, when melted, pressed out from a space between the conductor 21 and the connecting part 530. When the coating part 22 being positioned between the conductor 21 and the connecting part 530 has thereby been removed, the conductor 21 and the connecting part 530 come into contact with each other.

When the conductor 21 and the connecting part 530 come into contact with each other, pressure applied to the flat cable 2 and the terminal 503 (pressing force of the chip 404) is reduced. Subsequently, the chip 404 is ultrasonically vibrated for a specified period with pressing force thereof reduced. Then, the conductor 21 and the connecting part 530 are solid-phase bonded together.

As described above, in the bonding method of the present embodiment, the chip 404 comes into contact with the terminal 503 to cause the terminal 503 to ultrasonically vibrate. Heat is generated thereby in the terminal 503, and the coating part 22 being positioned between the conductor 21 and the connecting part 530 is melted to be removed effectively in a short time by the heat. Accordingly, the amount of the coating part 22 remaining between the conductor 21 and the connecting part 530 is reduced. This enhances strength of bonding between the conductor 21 and the terminal 503.

A mechanism of the bonding method of the fifth embodiment is as follows: the chip 404 comes into contact with the flat cable 2; then the flat cable 2 ultrasonically vibrates; frictional heat is generated in a face in the coating part 22 of the flat cable 2, the face being in contact with the chip 404; the heat is transmitted to the coating part 22 lying intermediately between the conductor 21 and the plate part 31; and the coating part 22 in the intermediate part is melted. Meanwhile, a mechanism of the bonding method of the present embodiment is as follows: the chip 404 comes into contact with the terminal 503; then the terminal 503 ultrasonically vibrates; frictional heat is generated in a face in the connecting part 530 of the terminal 503, the face being in contact with the chip 404; the heat is transmitted to the coating part 22 lying intermediately between the conductor 21 and the connecting part 530; and the coating part 22 in the intermediate part is melted. The terminal 503 is made of metal, and has higher thermal conductivity than the coating part 22 of the flat cable 2. In the bonding method of the present embodiment, therefore, the coating part 22 being positioned between the conductor 21 and the connecting part 530 is melted to be removed more efficiently and in a shorter time as compared to the bonding method of the fifth embodiment.

Further, in the above-described bonding method of the present invention, the flat cable 2 is located on the upper side of the terminal 503, when the flat cable 2 and the terminal 503 are sandwiched between the chip 404 and the anvil 405. This prevents the coating part 22 which have been melted at the time of the bonding from adhering to the ultrasonic bonding device 501.

Seventh Embodiment

Figure 17:
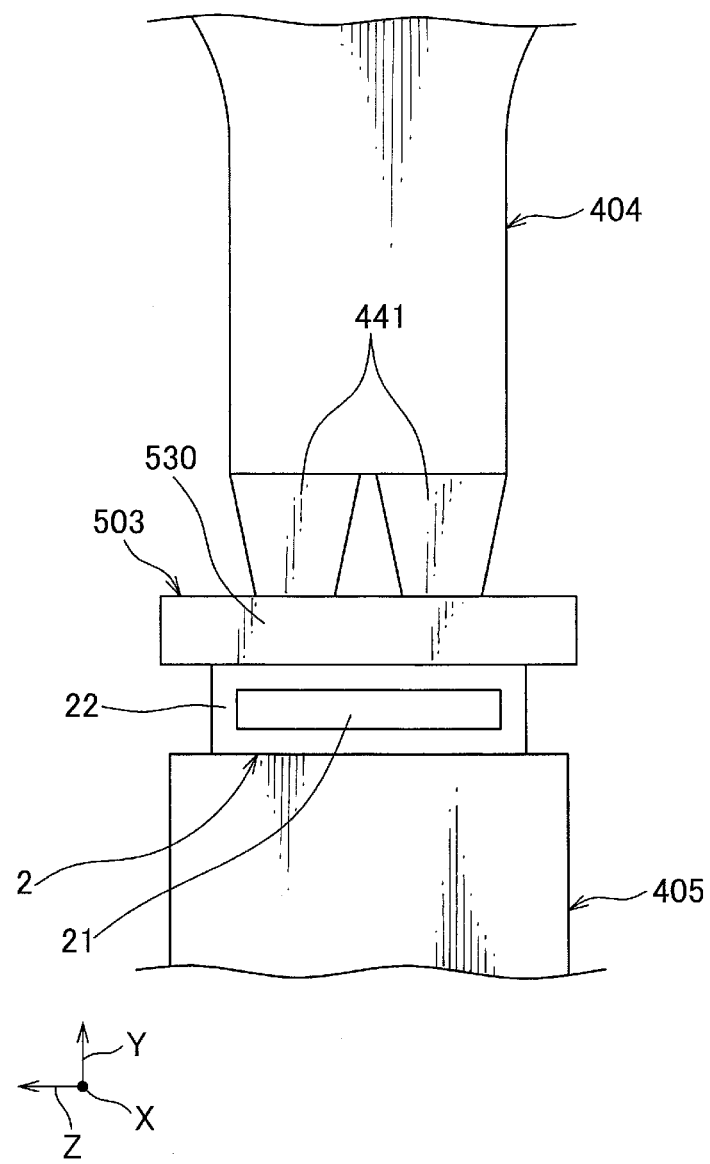
FIG. 17 is a front view of an ultrasonic bonding device used in a bonding method according to a seventh embodiment of the present invention.
Figure 18:
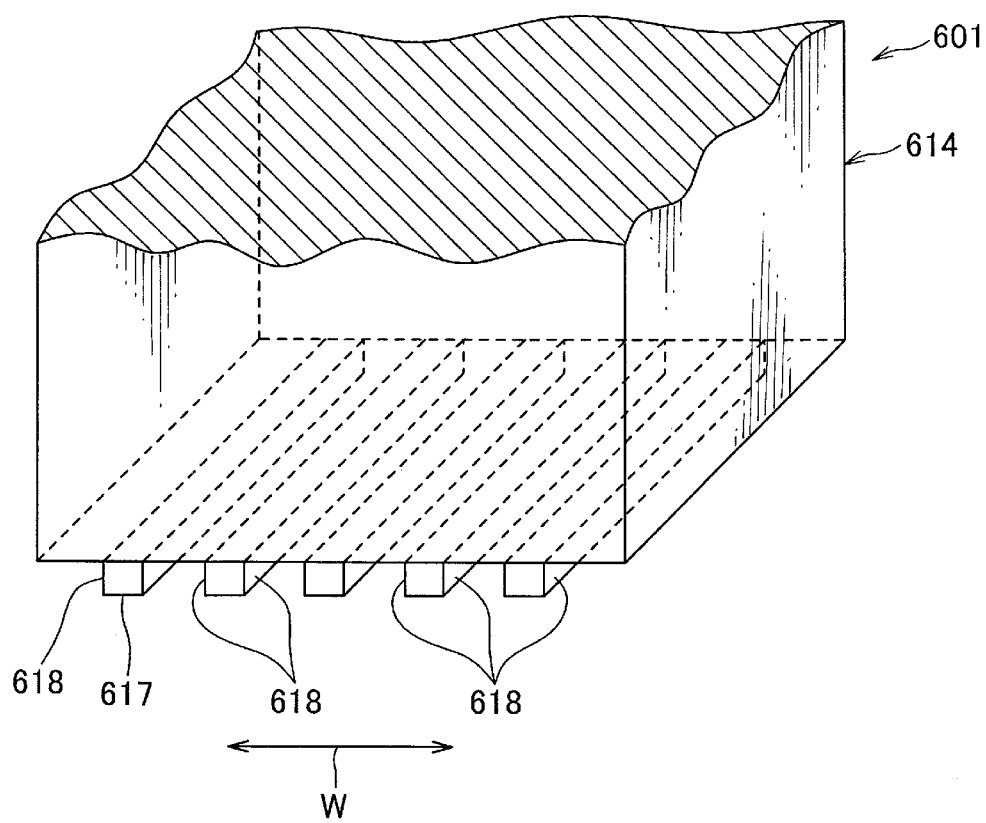
FIG. 18 is a perspective view of a chip provided in a conventional ultrasonic bonding device.

A "bonding method for bonding a flat cable and a bonding object together" according to a seventh embodiment of the present invention is described below with reference to FIG. 17. The "bonding method for bonding a flat cable and a bonding object together" according to the present embodiment is a bonding method for bonding the flat cable 2 and a terminal 503 as the bonding object which are shown in FIG. 17, by using an ultrasonic bonding device 401 also shown in FIG. 17. In FIG. 17, a component which is the same as that in the fifth and sixth embodiments described above is indicated by the same reference sign as used in the fifth and sixth embodiments, and will not be defined in a repetitive manner.

In the present embodiment, the flat cable 2 has the same configuration as described in the fifth and sixth embodiments. The terminal 503 has the same configuration as described in the sixth embodiment. The ultrasonic bonding device 401 has the same configuration as described in the fifth embodiment.

The following is a description of the bonding method for bonding the flat cable 2 and the terminal 503 by using the ultrasonic bonding device 401.

First, the flat cable 2 and the terminal 503 are positioned at the anvil 405, with the chip 404 separated from the anvil 405. At this time, the connecting part 530 is placed on the flat cable 2. Subsequently, the chip 404 is moved closer to the anvil 405 so that the protrusion 441 comes into contact with the connecting part 530. Simultaneously, the flat cable 2 and the terminal 503 are sandwiched between the chip 404 and the anvil 405. Then, the chip 404 is moved still closer to the anvil 405. Thereby the flat cable 2 and the terminal 503 are pressed so as to be moved close to each other. Concurrently with that, the chip 404 is ultrasonically vibrated in the X and Z axes directions.

When the chip 404 ultrasonically vibrates, vibrations of the chip 404 propagate to the connecting part 530 via the protrusion 441, causing the terminal 503 to ultrasonically vibrate. When the terminal 503 ultrasonically vibrates, heat is generated in the connecting part 530 by friction between the chip 404 and the connecting part 530. The heat is transmitted to the entire connecting part 530, and then the coating part 22 starts to melt from the heat. Concurrently with that, the flat cable 2 is pressed toward the terminal 503. Thus, the coating part 22 being positioned between the conductor 21 and the connecting part 530 is, when melted, pressed out from a space between the conductor 21 and the connecting part 530. When the coating part 22 being positioned between the conductor 21 and the connecting part 530 has thereby been removed, the conductor 21 and the connecting part 530 come into contact with each other.

When the conductor 21 and the connecting part 530 come into contact with each other, pressure applied to the flat cable 2 and the terminal 503 (pressing force of the chip 404) is reduced. Subsequently, the chip 404 is ultrasonically vibrated for a specified period with pressing force thereof reduced. Then, the conductor 21 and the connecting part 530 are solid-phase bonded together.

As described above, In the bonding method of the present embodiment as in the sixth embodiment, the chip 404 comes into contact with the terminal 503 to cause the terminal 503 to ultrasonically vibrate, whereby heat is generated in the terminal 503, and then the coating part 22 being positioned between the conductor 21 and the connecting part 530 is melted to be removed effectively in a short time by the heat. This reduces the amount of the coating part 22 remaining between the conductor 21 and the connecting part 530, and thus enhances strength of bonding between the conductor 21 and the terminal 503.

Additionally, in the bonding method of the present embodiment, as in the sixth embodiment, the chip 404 comes into contact with the connecting part 530 of the terminal 503, causing the terminal 503 to ultrasonically vibrate. As the connecting part 530 of the terminal 503 has higher thermal conductivity than the coating part 22 of the flat cable 2, the coating part 22 being positioned between the conductor 21 and the connecting part 530 is melted to be removed more efficiently and in a shorter time as compared to the bonding method of the fifth embodiment.

In the first to the seventh embodiments described above, the terminal 3, 203, or 503 is described as an example of the bonding object. However, the bonding object may be a metal structure in place of the terminal 3, 203, and 503.

The foregoing embodiments have been described by way of typical embodiments of the present invention, and the present invention is not limited to the disclosed embodiments. In other words, various modifications and alterations may be made without departing from the spirit of the present invention.

What is claimed is:

1. A bonding method for bonding a flat cable and a bonding object together by using an ultrasonic bonding device, the flat cable having a conductor coated with a coating part, comprising:
   setting the flat cable and the bonding object between a chip attached to a horn and an anvil such that the chip and the anvil come into contact with the bonding object, the flat cable and the bonding object being pressed in such directions that the flat cable and the bonding object come close to each other, while the bonding object is ultrasonically vibrated by vibrations of the chip being in contact with the bonding object; and
   causing the coating part being positioned between the conductor and the bonding object to melt from heat generated by ultrasonic vibrations of the bonding object and to be removed, the conductor and the bonding object coming into contact with each other to be bonded together.

2. The bonding method for bonding a flat cable and a bonding object together according to claim 1, wherein
   the bonding object includes a plate part to be overlapped with the flat cable, and a pair of wall parts standing from both ends of the plate part such that the flat cable is positioned between the wall parts,
   placing the pair of wall parts between a pair of guiding parts provided in the anvil of the bonding object,
   a protrusion provided between the pair of guiding parts in the anvil is made to press the flat cable toward the bonding object, and
   the chip is made to come into contact with a face of the plate part, the face being on the opposite side from the flat cable, causing the bonding object to ultrasonically vibrate.

3. The bonding method for bonding a flat cable and a bonding object together according to claim 1, wherein
   the bonding object includes a plate part to be overlapped with the flat cable, and a pair of wall parts standing from both ends of the plate part such that the flat cable is positioned between the wall parts,
   a protrusion projecting from an end face of the chip is made to press the flat cable toward the bonding object, and
   the end face of the chip is made to come into contact with the pair of wall parts, causing the bonding object to ultrasonically vibrate.

4. The bonding method for bonding a flat cable and a bonding object together according to claim 1, wherein
   the flat cable is located on the upper side of the bonding object while the flat cable and the bonding object are sandwiched between the chip and the anvil.

5. The bonding method for bonding a flat cable and a bonding object together according to claim 2, wherein
   the flat cable is located on the upper side of the bonding object while the flat cable and the bonding object are sandwiched between the chip and the anvil.

6. The bonding method for bonding a flat cable and a bonding object together according to claim 3, wherein the flat cable is located on the upper side of the bonding object while the flat cable and the bonding object are sandwiched between the chip and the anvil.

7. A bonding method for bonding a flat cable and a bonding object together by using an ultrasonic bonding device, the flat cable having a conductor coated with a coating part, comprising:
   setting the flat cable and the bonding object between a chip attached to a horn and an anvil such that the flat cable and the bonding object are being pressed, while the flat cable or the bonding object is ultrasonically vibrated by vibrations of the chip; and
   reducing pressure applied to the flat cable and the bonding object to bond the conductor and the bonding object together, at a time when the coating part being positioned between the conductor and the bonding object is removed to make the conductor and the bonding object come into contact with each other.

8. The bonding method for bonding a flat cable and a bonding object together according to claim 7, wherein
   the flat cable is located on the upper side of the bonding object while the flat cable and the bonding object are sandwiched between the chip and the anvil.

9. The bonding method for bonding a flat cable and a bonding object together according to claim 7, wherein
   the chip is made to come into contact with the bonding object, causing the bonding object to ultrasonically vibrate.

10. The bonding method for bonding a flat cable and a bonding object together according to claim 7, wherein
    the coating part being positioned between the conductor and the bonding object is removed, thus resulting in detection of a contact between the conductor and the bonding object.

11. The bonding method for bonding a flat cable and a bonding object together according to claim 8, wherein
    the coating part being positioned between the conductor and the bonding object is removed, thus resulting in detection of a contact between the conductor and the bonding object.

12. The bonding method for bonding a flat cable and a bonding object together according to claim 9, wherein
    the coating part being positioned between the conductor and the bonding object is removed, thus resulting in detection of a contact between the conductor and the bonding object.

* * * * *